Sept. 12, 1967     V. A. TROFFA     3,340,623

ARITHMETIC MEANS FOR CHILDREN

Filed Feb. 12, 1965

INVENTOR.
VITO A. TROFFA
BY *James P. Malone*

3,340,623
ARITHMETIC MEANS FOR CHILDREN
Vito A. Troffa, 15 Hazel St., Glen Cove, N.Y. 11542
Filed Feb. 12, 1965, Ser. No. 432,249
4 Claims. (Cl. 35—31)

This invention relates to arithmetic means for children and more particularly to a device for assisting children in learning multiplication tables and addition.

A principal object of the invention is to provide new and improved means to assist children in learning multiplication tables and addition in an interesting way.

The present device may be considered an educational game rather than strictly an educational device.

Another object of the invention is to provide new and improved arithmetic means for children incorporating a board having spaced terminals, a rotatable multiplication indicator and a pair of electrically energized pencils or probes which they use to contact predetermined terminals in order to actuate predetermined lights on the board.

Another object of the invention is to provide new and improved means comprising a board member having a rotatably mounted indicator which cooperates with a sliding member to indicate the correct answer.

Another object of the invention is to provide new and improved arithmetic means comprising a pair of hollow columns one of the columns having a plurality of numbered multiplier push buttons and the other column having a rotatably mounted multiplication indicator and a ball adapted to be dropped down in the first column so as to come to rest at the selected multiplier. The rotatable indicator then indicates the correct answer.

Another object of the invention is to provide new and improved arithmetic means comprising a similar pair of columns which are electrically connected with indicator lights so that a circuit will be established through a conductive ball which will light the correct answer.

These and other objects of the invention will be apparent from the following specification and drawings of which:

Figure 1:
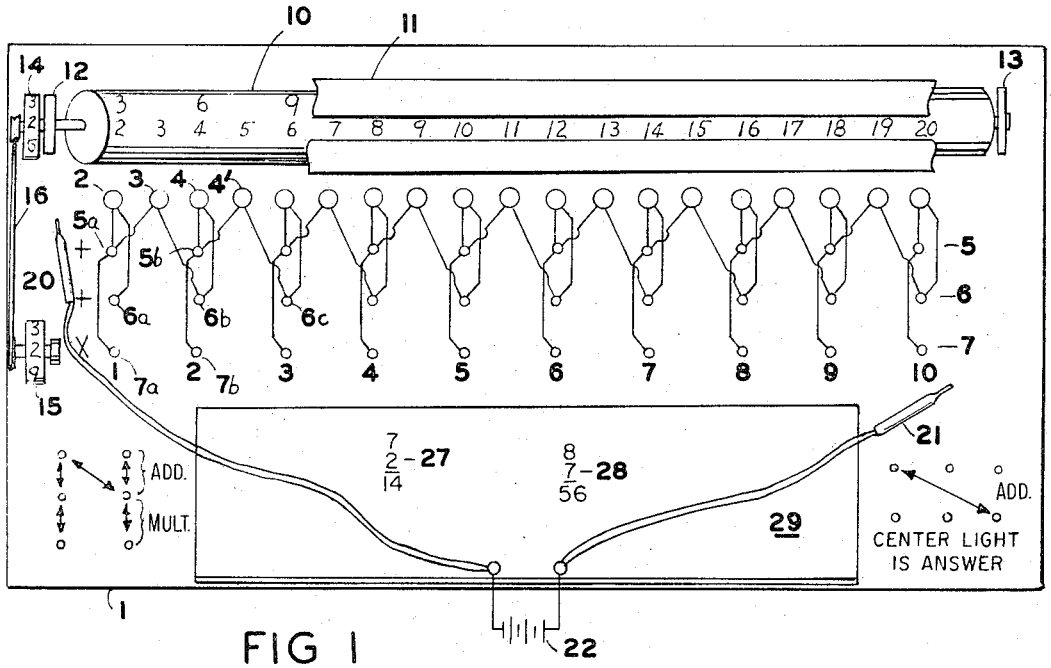
FIGURE 1 is a front view of an embodiment of the invention.

Referring to FIGURE 1, there is shown a board 1 which has a horizontal row of lights 2, 3, 4, etc. and three horizontal rows of terminals 5, 6, 7. The three horizontal rows of terminals are arranged in a vertical arrangement under the lights. Above the rows of lights, is mounted a rotatable indicator 10 which may be a cylinder or a member having a plurality of flat sides. The rotatable indicator has a plurality of multiplication tables which are keyed to predetermined vertical lines. For instance, the two times table is shown which is the one in use since it appears through the mask 11. In addition, to the two times table there are shown intermediate numbers which are used for addition purposes as will be described.

The lights 2, 3, 4, etc. are connected to terminals of the rows 5 and 6 in their vertical row. The terminals on the rows 5 and 7 are connected together in each vertical row. The rotatable indicator is rotatably mounted in brackets 12 and 13 on board 1 and the shaft of the indicator has a handle 14 which turns the device which preferably has a detent mechanism to center the tables through the mask 11.

A multipler indicator 15 is chain connected to the indicator 10 by means of chain 16. The indicator 15 is optional but is preferably used to indicate the multiplication row 7. A pair of conductive pencils or probes 20 and 21 are connected in series with a battery 22. The device is set to show the two times table and the vertical rows are numbered from 1 to 10. The circuit connections are shown but the wiring is preferably behind the board. A blackboard 29 is preferably provided for laying out problems as illustrated at 27 and 28.

The multiplication is performed by applying the pencils to for instance, the terminals 6a and 7a on rows 6 and 7. When the pencils are applied as described, they will complete the circuit to the light 2 indicating that 1×2=2. Similarly, when the probes are placed on the terminals 7b and 6b, the light 4 indicator would show 2×2=4 on the indicator 10.

Addition is performed by placing the pencil on terminals of the rows 5 and 6 for instance, if the pencils are placed on the terminals 5a and 6a, the circuit will be complete between these terminals and the light 2 to indicate 1+1=2. Silimarly, if the pencils are placed on the terminals 5b and 6b, the light 4 will light indicating that 2+2=4.

Another mode of addition operation is possible by connecting the pencils to the rows 5 and 6 one vertical row apart for instance, if the pencils are placed on terminals 5a and 6b, the light 3 will indicate 1+2=3.

If the pencils are placed on terminals in rows 5 and 6, two vertical lines apart, then three lights will light and the center light will be the answer. For instance, if the pencils are placed on terminals 5a and 6c, the lights 3, 4, and 4' will light and the center light 4 will indicate 1+3=4.

The addition mode of operation does not extend further than two vertical rows apart.

Figure 2:
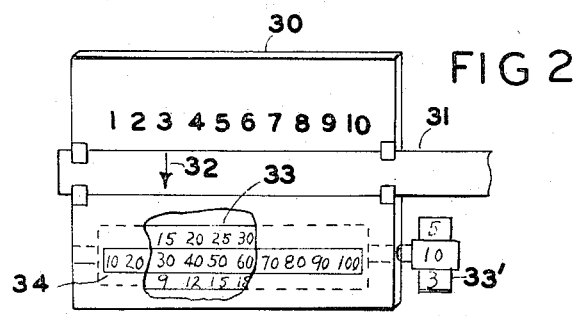
FIGURE 2 is a front view of the invention using a board with a sliding indicator.

Referring to FIGURE 2, there is shown another version of the invention which comprises a board 30 having a horizontal row numbered from 1 to 10, a sliding indicator 31 which slides on the board and has an indicator arrow 32. There is a rotatable multiplication table indicator 33 rotatably mounted on the board and under the sliding member 31. The rotatable indicator is similar to the indicator 10. However, it has no addition mode of operation.

The multiplication table is selected by rotating handle 33' so that the desired table is shown in the aperture 34. The mask is cut away to show a plurality of tables on the member 33. In using this embodiment of the invention, the member 31 is slid so that the arrow 32 is under the desired multiplier and the answer will be indicated on the indicator member 33. For instance, as shown the arrow 32 indicates that 3×10=30.

Figure 3:
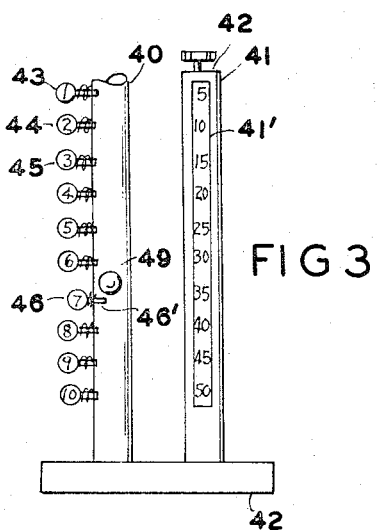
FIGURE 3 is an embodiment of the invention using a pair of columns and falling ball.

Referring to FIGURE 3, there is shown another embodiment comprising a pair of hollow columns or cylinders 40 and 41 which may be transparent and which are set on a horizontal base 42. The column 41 has a rotatable multiplication indicator 42 which is similar to the indicator 33 of FIGURE 2 and the numbers are adapted to be read through aperture 41'.

The column 40 has a plurality of push buttons 43, 44, 45 etc. numbered from 1 to 10 and the push buttons are spring loaded out. This device is used as follows:

The five times table is shown on the rotatable indicator 42. Assume the child wishes to find out 7×5. He pushes the push button 46 which has number 7 on it, and drops a ball 49 into the top of the column. The ball will come to rest at the top of the projection 46' and the answer 35 may be read on the corresponding rotatable indicator.

The push buttons may be operated manually or they may be detented so that they may be pushed in and remain in the selected position.

Figure 4:
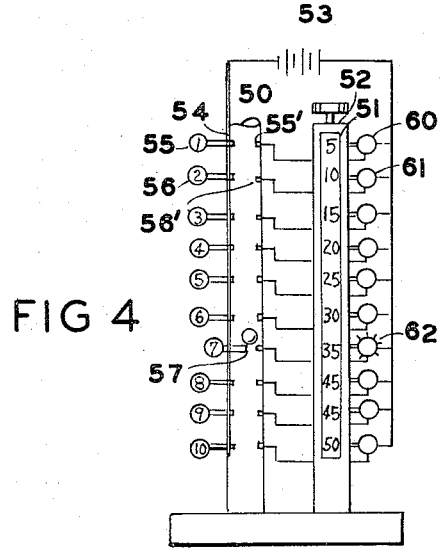
FIGURE 4 is another embodiment of the invention using a pair of columns with a metal ball and with electrical indicator lights.

FIGURE 4 shows an electrical modification of FIGURE 3. There are two columns 50 and 51 and a rotatable indicator 52. This embodiment is different from that of FIGURE 1 in that the battery 53 is connected to a metal strip 54 connected to the numbered push buttons 55, 56, etc. and a metal ball 57 is used. Mounted opposite the push buttons are terminals 55' and 56' etc. These terminals are connected to lights 60, 61 etc. which are mounted on columns 51 and are equally spaced according to the numbers of the multiplication tables appearing on the rotatable indicator 52. The other terminals of the lights are connected to the other side of battery 53. Therefore, if the child desires to find the answer of 7×5, he pushes the push button numbered 7 and drops the metal ball 57 down the column where upon the light 62 will be energized indicating the correct answer 35.

Many modifications may be made by those who desire to practice the invention without departing from the scope thereof which is defined by the following claims:

I claim:
1. A child's arithmetic device comprising:
   a board member,
   a first horizontal row of lights equally spaced on said board near the top thereof,
   first, second and third rows of terminals mounted on said board and equally spaced under said lights to form vertical rows each light being connected to terminals in said first and second horizontal rows said terminals in said vertical rows in said first and third horizontal rows being connected together,
   a pair of conductive probes fastened to said board,
   a battery connected in series with said probes,
   a rotatable indicator mounted horizontally adjacent said lights, said indicator having a plurality of sides, said indicator having a plurality of numbers on each side arrangement according to predetermined multiplication tables, said probes being adapted to be connected to said terminals in predetermined manner to light a predetermined one of said lights to indicate the correct answer on said indicator.

2. Apparatus as in claim 1 wherein said indicator also contains numbers containing the correct addition answer when said probes are placed on predetermined terminals.

3. A child's arithmetic device comprising:
   a base member,
   a first hollow transparent column member mounted vertically on said base member,
   a second hollow column member having ten spring loaded multiplier push buttons equally spaced in the vertical direction, said push buttons being numbered from 1 to 10, said push buttons being adapted to push in so as to extend inside said column,
   a ball adapted to be dropped from the top of said second column, so that said ball will be held by any push button that is pushed in,
   an indicator rotatably mounted in said first column parallel to said first column,
   said indicator having a plurality of vertical rows of multiplication table answers,
   said multiplication table answers being keyed in the same horizontal levels as said numbered multiplier push buttons, and
   a mask adapted to cover said indicator so that only one multiplication table will show.

4. Apparatus as in claim 3 wherein said column members contain electrical terminals at all numbered positions, and said ball is of conductive material and said first column has a plurality of indicator lights.

References Cited

UNITED STATES PATENTS

| | | | |
|---|---|---|---|
| 521,360 | 6/1894 | Bechman | 35—31 |
| 677,952 | 7/1901 | Cartwright | 35—31.3 X |
| 2,624,126 | 1/1953 | Bolognino et al. | 35—31.1 |
| 3,070,904 | 1/1963 | Saba | 35—9 |
| 3,226,533 | 12/1965 | Beers | 35—31 X |

FOREIGN PATENTS

| | | |
|---|---|---|
| 839,119 | 5/1952 | Germany. |
| 507,678 | 12/1954 | Italy. |

EUGENE R. CAPOZIO, *Primary Examiner.*

W. GRIEB, *Assistant Examiner.*